(12) United States Patent
Miller

(10) Patent No.: US 8,984,858 B2
(45) Date of Patent: Mar. 24, 2015

(54) GAS TURBINE ENGINE

(75) Inventor: Matthew Michael Miller, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 626 days.

(21) Appl. No.: 13/336,288

(22) Filed: Dec. 23, 2011

(65) Prior Publication Data

US 2012/0192572 A1 Aug. 2, 2012

Related U.S. Application Data

(60) Provisional application No. 61/428,737, filed on Dec. 30, 2010.

(51) Int. Cl.
*F02C 7/12* (2006.01)
*F01D 25/16* (2006.01)

(52) U.S. Cl.
CPC . *F01D 25/16* (2013.01); *F02C 7/12* (2013.01); *F05D 2240/50* (2013.01); *F05D 2260/20* (2013.01); *Y02T 50/675* (2013.01); *Y10S 384/90* (2013.01)
USPC ............ 60/39.83; 60/806; 384/371; 384/320; 384/476; 384/900

(58) Field of Classification Search
CPC ....... F01D 25/16; F01D 25/125; F25B 21/02; H01L 35/32
USPC ......... 60/39.83, 806; 384/317, 320, 321, 476, 384/900
See application file for complete search history.

(56) References Cited

U.S. PATENT DOCUMENTS

| | | | | |
|---|---|---|---|---|
| 3,097,027 A | * | 7/1963 | Mims et al. | 384/476 |
| 3,433,020 A | * | 3/1969 | Sumey et al. | 60/226.1 |
| 3,706,483 A | * | 12/1972 | Irwin | 384/448 |
| 3,845,619 A | | 11/1974 | O'Neill | |
| 4,222,705 A | | 9/1980 | Smith | |
| 4,709,545 A | * | 12/1987 | Stevens et al. | 60/39.08 |
| 4,896,975 A | | 1/1990 | Bescoby et al. | |
| 4,968,158 A | | 11/1990 | Atkinson et al. | |
| 5,046,920 A | * | 9/1991 | Higashi et al. | 415/111 |
| 5,052,828 A | | 10/1991 | Ciokajlo et al. | |
| 5,054,583 A | * | 10/1991 | Wrzyszczynski | 184/6.26 |
| 5,415,478 A | | 5/1995 | Matthews et al. | |
| 7,562,519 B1 | | 7/2009 | Harris et al. | |
| 7,614,853 B2 | | 11/2009 | Saville | |
| 2005/0076644 A1 | * | 4/2005 | Hardwicke et al. | 60/772 |
| 2006/0101831 A1 | * | 5/2006 | Storm et al. | 62/3.7 |
| 2009/0218170 A1 | | 9/2009 | Hoffmann et al. | |
| 2009/0250197 A1 | | 10/2009 | Hassett et al. | |
| 2009/0263059 A1 | | 10/2009 | Bayer et al. | |
| 2009/0263062 A1 | * | 10/2009 | Smith et al. | 384/476 |

FOREIGN PATENT DOCUMENTS

GB 1130296 * 10/1968 ............... F16F 9/00

* cited by examiner

*Primary Examiner* — Gerald L Sung
*Assistant Examiner* — Steven Sutherland
(74) *Attorney, Agent, or Firm* — Barnes & Thornburg LLP

(57) ABSTRACT

One embodiment of the present invention is a unique gas turbine engine. Another embodiment of the present invention is a unique gas turbine engine bearing system. Other embodiments include apparatuses, systems, devices, hardware, methods, and combinations for gas turbine engines and gas turbine engine bearing systems. Further embodiments, forms, features, aspects, benefits, and advantages of the present application will become apparent from the description and figures provided herewith.

19 Claims, 2 Drawing Sheets

GAS TURBINE ENGINE

CROSS REFERENCE TO RELATED APPLICATIONS

The present application claims benefit of U.S. Provisional Patent Application No. 61/428,737, filed Dec. 30, 2010, entitled GAS TURBINE ENGINE, which is incorporated herein by reference.

FIELD OF THE INVENTION

The present invention relates to gas turbine engines, and more particularly, to gas turbine engines with bearing systems.

BACKGROUND

Gas turbine engine bearing systems that effectively remove heat from bearings remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment of the present invention is a unique gas turbine engine bearing system. Other embodiments include apparatuses, systems, devices, hardware, methods, and combinations for gas turbine engines and gas turbine engine bearing systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
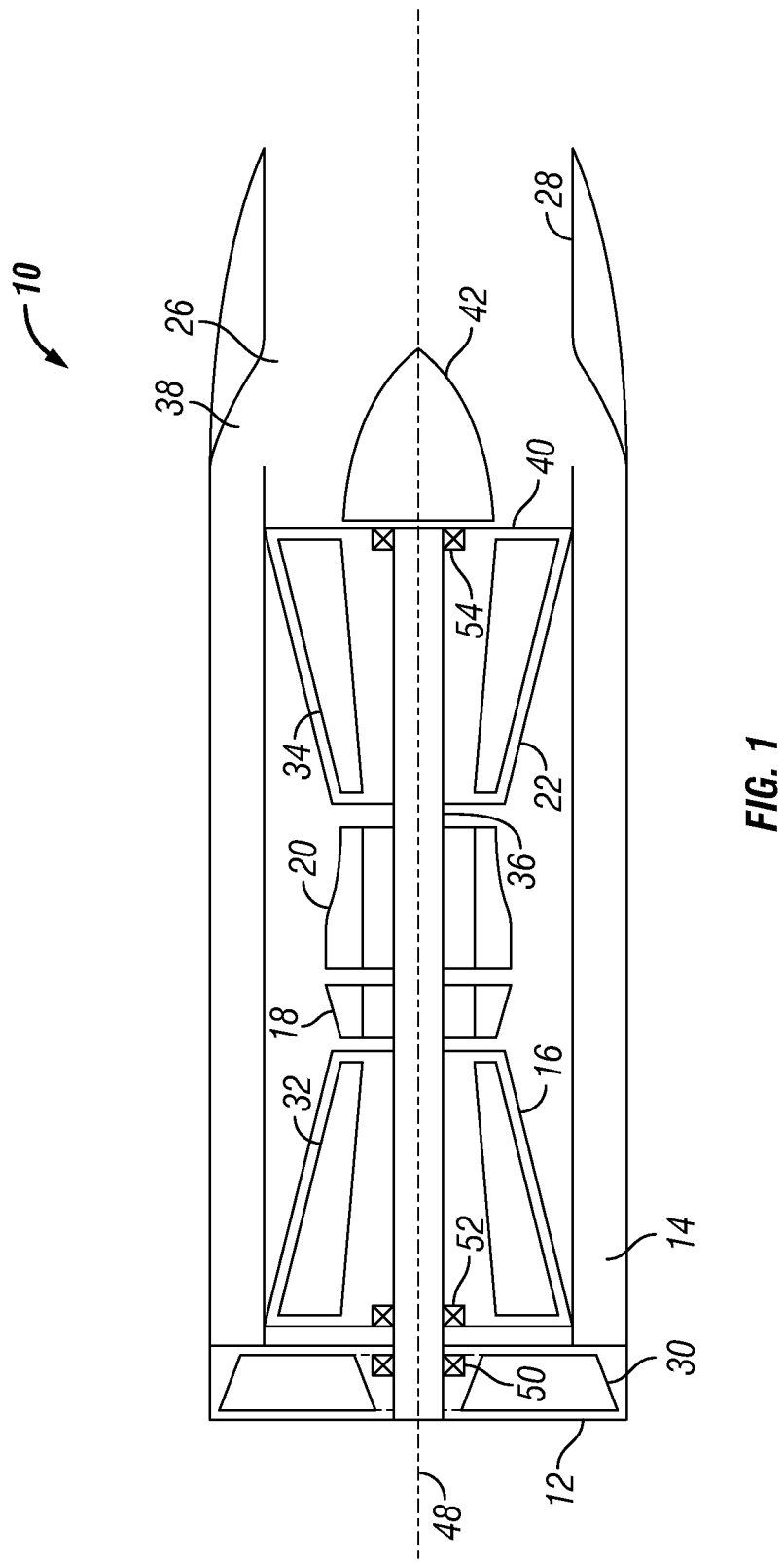
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a gas turbine engine 10 in accordance with an embodiment of the present invention is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor 16, a diffuser 18, a combustor 20, a turbine 22, a discharge duct 26 and a nozzle system 28. Bypass duct 14 and compressor 16 are in fluid communication with fan system 12. Diffuser 18 is in fluid communication with compressor 16. Combustor 20 is fluidly disposed between compressor 16 and turbine 22. In one form, combustor 20 includes a combustion liner (not shown) that contains a continuous combustion process. In other embodiments, combustor 20 may take other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine 22. Bypass duct 14 is operative to transmit a bypass flow generated by fan system 12 to nozzle 28. Compressor 16 includes a compressor rotor system 32. In various embodiments, compressor rotor system 32 includes one or more rotors (not shown) that are powered by turbine 22. Each compressor rotor includes a plurality of rows of compressor blades (not shown) that are alternatingly interspersed with rows of compressor vanes (not shown). Turbine 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) that are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine 22 is operative to discharge an engine 10 core flow to nozzle 28. In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48. Fan rotor system 30 loads, compressor rotor system 32 loads, turbine rotor system 34 loads and shafting system 36 loads are supported and reacted by a plurality of bearing systems, e.g., including bearing systems 50, 52 and 54.

Discharge duct 26 extends between a bypass duct discharge portion 38, a discharge portion 40 of turbine 22 and engine nozzle 28. Discharge duct 26 is operative to direct bypass flow and core flow from bypass duct discharge portion 38 and turbine discharge portion 40, respectively, into nozzle system 28. In some embodiments, discharge duct 26 may be considered a part of nozzle 28. Nozzle 28 is in fluid communication with fan system 12 and turbine 22. Nozzle 28 is operative to receive the bypass flow from fan system 12 via bypass duct 14, and to receive the core flow from turbine 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor 16 as core flow, and some of the pressurized air is directed into bypass duct 14 as bypass flow, and is discharged into nozzle 28 via discharge duct 26. Compressor 16 further pressurizes the portion of the air received therein from fan 12, which is then discharged into diffuser 18. Diffuser 18 reduces the velocity of the pressurized air, and directs the diffused core airflow into combustor 20. Fuel is mixed with the pressurized air in combustor 20, which is then combusted. The hot gases exiting combustor 20 are directed into turbine 22, which extracts energy in the form of mechanical shaft power sufficient to drive fan system 12 and compressor 16 via shafting system 36. The core flow exiting turbine 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Figure 2:
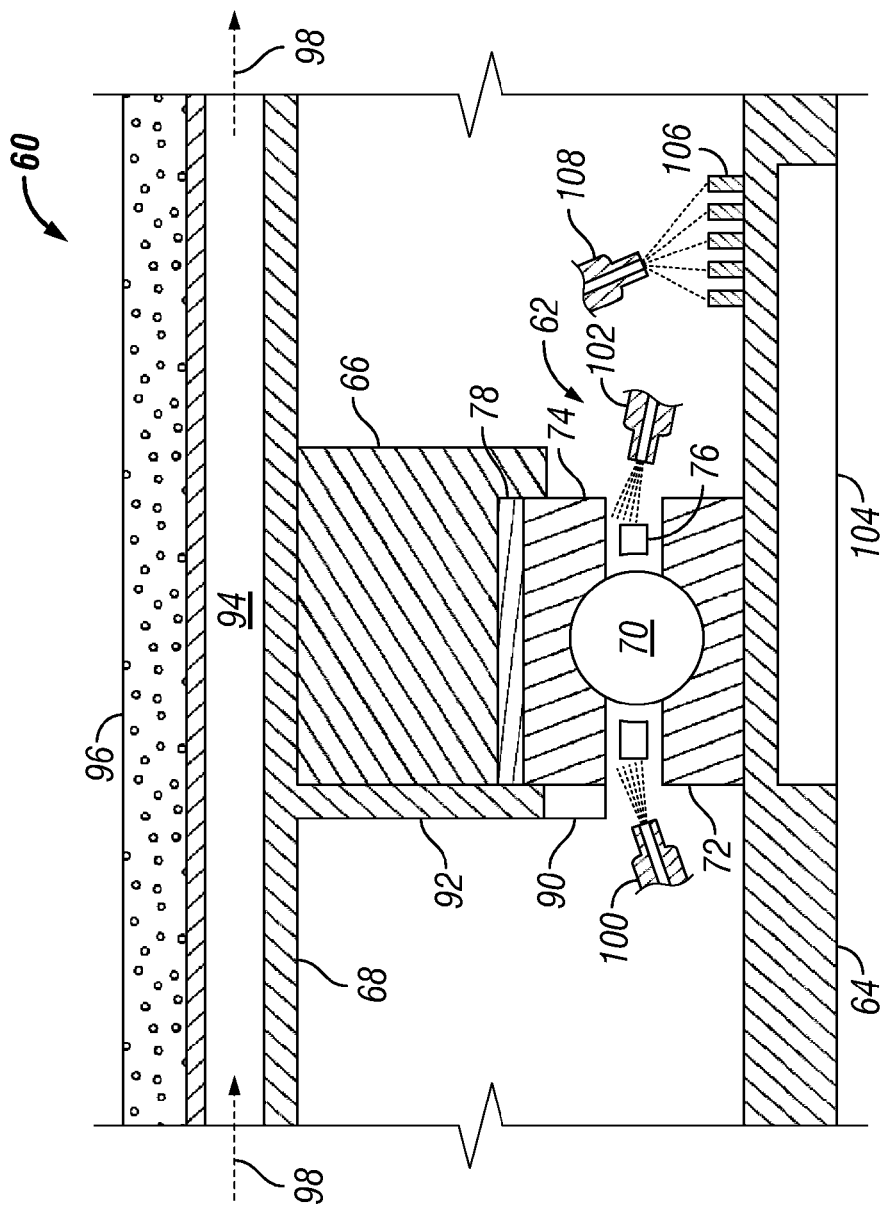
FIG. 2 illustrates some aspects of non-limiting examples of a bearing system and various means for removing heat from a bearing in accordance with embodiments of the present invention.

Referring now to FIG. 2, a non-limiting example of some aspects of a bearing system 60 is schematically illustrated. Bearing system 60 may be employed as one or more bearing systems in gas turbine engine 10, such as one or more of bearing systems 50, 52 and 54. Bearing system 60 includes a rolling element bearing 62, a shaft 64, a bearing support structure 66 and a sump housing 68. Bearing 62 includes a plurality of rolling elements 70, an inner race 72, an outer race 74 and a separator 76. In one form, bearing 62 is a ball bearing. In other embodiments, bearing 62 may take other forms, for example and without limitation, a roller bearing, a tapered roller bearing, a spherical roller bearing, a needle bearing or any other type of bearing. Inner race 72 is mounted on shaft 64. Shaft 64 may be considered a part of shafting system 36. Outer race 72 is installed into bearing support structure 66. Outer race 72 may be anti-rotated by means not shown. In some embodiments, one or more of a squeeze film damper 78 may be disposed between outer race 74 and support structure 66. In some embodiments, an oil film for squeeze film damping, without additional structure, may be disposed between outer race 74 and support structure 66. Separator 76 is configured to maintain a spacing relationship between rolling elements 70. In one form, bearing 62 is configured to react rotor loads. In other embodiments, bearing 62 may not be configured to react rotor loads. Support structure 66 is coupled to sump housing 68. Support structure 66 and sump housing 68 are configured to transmit rotor loads, e.g., thrust loads and radial loads, from bearing 62 to one or more engine 10 static structures (not shown).

It is desirable to remove heat from bearing 62 in order to enhance bearing 62 life and load-bearing capacity and maintain bearing internal clearances. Although oil jets may be employed to impinge one or more jets of liquid oil onto bearing 62 to both lubricate bearing 62 and remove heat from bearing 62, the inventor has determined that a substantial amount of heat generated by rolling element bearings is the result of viscous heating due to rolling element drag. In an exemplary analysis, it was determined that 76% of rolling element bearing heat generation resulted from viscous heating. Accordingly, other means of removing heat from rolling element bearings are desirable. In various embodiments, bearing system 60 employs one or more of the plurality of means for heat removal set forth herein and/or modifications thereof. In one form, bearing system 60 is configured to remove heat from bearing 62 without using liquid oil, e.g., jets of liquid oil, as a heat transfer medium. Various schemes may be employed to lubricate bearing 62, for example and without limitation, dry film lubrication and/or oil mist lubrication.

In one form, bearing system 60 includes an electro-thermal cooling system 90. Cooling system 90 is configured to remove heat from bearing 62, and functions as a heat sink. Cooling system 90 is provided with electrical power by means not shown. In one form, cooling system 90 is a thermoelectric cooler (TEC). TECs are commercially available, for example, from Nextreme Thermal Solutions, Inc., of Durham, N.C., USA. In other embodiments, cooling system 90 may take other forms. For example and without limitation, in some embodiments, cooling system 90 may be in the form of a thermionic cooler. Thermionic coolers, sometimes referred to as thermal chips, are commercially available, for example, from MicroPower Global Corporation of San Marcos, Tex., USA; and from Cool Chips plc of Gibraltar, a British Crown Colony located in Southern Europe. In one form, cooling system 90 is mounted directly on bearing 62, e.g., on outer race 74. In other embodiments, cooling system 90 may be positioned elsewhere in, on or about bearing system 60. In one form, cooling system 90 is thermally bonded to bearing 62, i.e., using a bonding technique that reduces thermal resistance between mating components. Examples of thermal bonding include the use of thermal bonding compounds, such as a metal-oxide loaded two part epoxy, thermal greases, or direct bonding of the materials, e.g., by brazing.

In one form, bearing system 60 includes a high conductivity thermal pathway 92, which functions as a heat sink. High conductivity thermal pathway 92 is configured to direct heat from bearing 62 to sump housing 68. High conductivity thermal pathway 92 is coupled to cooling system 90. In one form, high conductivity thermal pathway 92 is a material system configured to direct heat from cooling system 90. In other embodiments, high conductivity thermal pathway 92 may be or may include a heat pipe. In one form, high conductivity thermal pathway 92 is thermally bonded to cooling system 90. In other embodiments, high conductivity thermal pathway 92 may be thermally bonded directly to bearing 62, e.g., outer race 74, in addition to or in place of cooling system 90. This bond could be accomplished, for example and without limitation, by brazing the thermal pathway 92 to bearing 62 or outer race 74. High conductivity thermal pathway 92 is so named because the high conductivity thermal pathway 92 is constructed of materials having a high thermal conductivity and/or takes the form of a heat pipe. Examples of high thermal conductivity materials include, but are not limited to: copper (~400 W/m-K); Aluminum (~200 W/m-K); highly oriented pyrolytic graphite (HOPG) (~1500+ W/m-K in designated directions); Al-graphite (~600 W/m-K in designated directions); Al-diamond (~600 W/m-K); and Cu-diamond (~600-800 W/m-K). Because these materials are on the order of one order of magnitude greater thermal conductivity than conventional steel, titanium and other materials commonly used to form gas turbine engine bearing system components, they are referred to as high thermal conductivity materials. In one form, sump housing 68 may form a part of high conductivity thermal pathway, e.g., by being formed of a high thermal conductivity material.

In one form, sump housing 68 includes a plurality of fins 94. Disposed between fins 94 and any external heat sources is an aerogel insulation 96. In other embodiments, other insulation types may be employed in addition to or in place of aerogel. Additional structure may be interposed between fins 94 and aerogel insulation 96. Aerogel insulation is commercially available from, for example and without limitation, Aspen Aerogels, Inc. of Northborough, Mass., USA. Pressurized cooling air 98, e.g., from fan 12 is flowed past (e.g., through) fins 94 in order to remove heat from sump housing 68. Aerogel insulation 96 is disposed around fins 94, and is configured to shield sump housing 68 from external heat sources, such as turbine 22. In other embodiments, other insulation types may be employed.

In one form, bearing system 60 includes one or more of a cooling air nozzle 100 disposed adjacent to bearing 62. Cooling air nozzle 100 is configured to direct cooling air to bearing 62 to remove heat from bearing 62.

In one form, bearing system 60 includes one or more of a mist nozzle 102 disposed adjacent to bearing 62. In one form, mist nozzle 102 is configured to direct a mist of lubricating fluid to bearing 62 to lubricate bearing 62. In one form, the mist is an oil mist. In other embodiments, other mists may be employed.

In one form, a heat pipe 104 is disposed within shaft 64 and rotates with shaft 64. Heat pipe 104 is hence referred to as a rotating heat pipe 104. Rotating heat pipe 104 is configured to remove heat from bearing 62. In one form, a plurality of cooling fins 106 are disposed on shaft 64. Cooling fins 106 are configured to remove heat from rotating heat pipe 104. In one form, one or more of a cooling air nozzle 108 is disposed adjacent to cooling fins 106 and configured to discharge cooling air onto fins 106 to remove heat from cooling fins 106. Heat may thus be removed from bearing 62 via rotating heat pipe 104 and cooling fins 106.

Embodiments of the present invention include a gas turbine engine, comprising: a compressor; a diffuser in fluid communication with the compressor; a combustor in fluid communication with the diffuser; a turbine in fluid communication with the combustor; and a bearing system having a bearing, wherein the bearing is configured to support the compressor and/or the turbine, wherein the bearing system includes an electro-thermal cooling system configured for removing heat from the bearing.

In a refinement, the electro-thermal cooling system is a thermoelectric cooler.

In another refinement, the electro-thermal cooling system is a thermionic cooler.

In yet another refinement, the bearing is a rolling element bearing having a bearing race; and wherein the electro-thermal cooling system is mounted on the bearing race.

In still another refinement, the gas turbine engine further comprises a high conductivity thermal pathway coupled to the electro-thermal cooling system and configured to direct heat from the electro-thermal cooling system.

In yet still another refinement, the bearing system is configured to remove heat from the bearing without using liquid oil as a heat transfer medium.

In a further refinement, the bearing is a rolling element bearing having a bearing race; and wherein the electro-thermal cooling system is mounted on the bearing race, further comprising a high conductivity thermal pathway coupled to the bearing race and configured to direct heat away from the bearing race.

In a yet further refinement, the high conductivity thermal pathway is formed at least in part of a high thermal conductivity material.

In a still further refinement, the high conductivity thermal pathway is formed at least in part by a heat pipe.

In a yet still further refinement, the bearing system includes sump housing; and wherein the high conductivity thermal pathway is configured to direct heat from the bearing to the sump housing.

In an additional refinement, the bearing is a rolling element bearing having a bearing race, further comprising a heat sink thermally bonded to the bearing race.

In another additional refinement, the bearing system includes sump housing having fins, further comprising means for flowing cooling air past the fins to remove heat from the sump housing.

In yet another additional refinement, the gas turbine engine further comprises aerogel insulation disposed around the sump housing and configured to shield the sump housing from an external heat source.

In still another additional refinement, the gas turbine engine further comprises a cooling air nozzle configured to direct cooling air to the bearing.

In yet still another additional refinement, the gas turbine engine further comprises a mist nozzle configured to direct a mist to the bearing.

In an additional further refinement, the mist is an oil mist.

In another additional further refinement, gas turbine engine further comprises a shaft, and a heat pipe disposed within the shaft, wherein the bearing is mounted on the shaft; and wherein the heat pipe is configured to remove heat from the bearing.

In yet another additional further refinement, the gas turbine engine further comprises a cooling fin mounted on the shaft and configured to remove heat from the heat pipe.

In still another additional further refinement, the gas turbine engine further comprises a cooling air nozzle configured to discharge cooling air onto the cooling fin and remove heat from the cooling fin.

Embodiments of the present invention include a gas turbine engine, comprising: a fan; a compressor in fluid communication with the fan; a diffuser in fluid communication with the compressor; a combustor in fluid communication with the diffuser; a turbine in fluid communication with the combustor; a bearing configured to support fan loads and/or compressor loads and/or turbine loads; and an electro-thermal cooling system configured to remove heat from the bearing.

In a refinement, the electro-thermal cooling system is a thermoelectric cooler thermally coupled to the bearing.

In another refinement, the electro-thermal cooling system is a thermionic cooler thermally coupled to the bearing.

Embodiments of the present invention include a gas turbine engine, comprising: a rotor; a bearing configured to react loads from the rotor; and means for electro-thermally removing heat from the bearing.

In a refinement, the gas turbine engine further comprises a plurality of other means for removing heat from the bearing.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a compressor;
   a diffuser in fluid communication with the compressor;
   a combustor in fluid communication with the diffuser;
   a turbine in fluid communication with the combustor;
   a bearing system including a bearing configured to support the compressor and the turbine, an electro-thermal cooling system configured for removing heat from the bearing, a sump housing; and
   an aerogel insulation disposed around the sump housing configured to shield the sump housing from an external heat source.

2. The gas turbine engine of claim 1, wherein the electro-thermal cooling system is a thermoelectric cooler.

3. The gas turbine engine of claim 1, wherein the electro-thermal cooling system is a thermionic cooler.

4. The gas turbine engine of claim 1, wherein the bearing is a rolling element bearing having a bearing race; and wherein the electro-thermal cooling system is mounted on the bearing race.

5. The gas turbine engine of claim 4, further comprising a high conductivity thermal pathway coupled to the electro-thermal cooling system and configured to direct heat from the electro-thermal cooling system.

6. The gas turbine engine of claim 1, wherein the bearing system is configured to remove heat from the bearing without using liquid oil as a heat transfer medium.

7. The gas turbine engine of claim 1, wherein the bearing is a rolling element bearing having a bearing race; and wherein the electro-thermal cooling system is mounted on the bearing race, further comprising a high conductivity thermal pathway coupled to the bearing race and configured to direct heat away from the bearing race.

8. The gas turbine engine of claim 7, wherein the high conductivity thermal pathway is formed at least in part of a high thermal conductivity material.

9. The gas turbine engine of claim 7, wherein the high conductivity thermal pathway is formed at least in part by a heat pipe.

10. The gas turbine engine of claim 7, wherein the high conductivity thermal pathway is configured to direct heat from the bearing to the sump housing.

11. The gas turbine engine of claim 1, wherein the bearing is a rolling element bearing having a bearing race, further comprising a heat sink thermally bonded to the bearing race.

12. The gas turbine engine of claim 1, wherein the sump housing has fins, further comprising means for flowing cooling air past the fins to remove heat from the sump housing.

13. The gas turbine engine of claim 1, further comprising a cooling air nozzle configured to direct cooling air to the bearing.

14. The gas turbine engine of claim 1, further comprising a mist nozzle configured to direct a mist to the bearing.

15. The gas turbine engine of claim 14, wherein the mist is an oil mist.

16. The gas turbine engine of claim 1, further comprising a shaft, and a heat pipe disposed within the shaft, wherein the bearing is mounted on the shaft; and wherein the heat pipe is configured to remove heat from the bearing.

17. The gas turbine engine of claim 16, further comprising a cooling fin mounted on the shaft and configured to remove heat from the heat pipe.

18. A gas turbine engine, comprising:
    a compressor;
    a diffuser in fluid communication with the compressor;
    a combustor in fluid communication with the diffuser;
    a turbine in fluid communication with the combustor;
    a bearing system having a bearing, wherein the bearing is configured to support the compressor and/or turbine, wherein the bearing system includes an electro-thermal cooling system configured for removing heat from the bearing and a sump housing having fins;
    means for flowing cooling air past the fins to remove heat from the sump housing; and
    aerogel insulation disposed around the sump housing and configured to shield the sump housing from an external heat source.

19. A gas turbine engine, comprising:
    a compressor;
    a diffuser in fluid communication with the compressor;
    a combustor in fluid communication with the diffuser;
    a turbine in fluid communication with the combustor;
    a bearing system having a bearing;
    a shaft;
    a heat pipe disposed within the shaft;
    a cooling fin mounted on the shaft and configured to remove heat from the heat pipe; and
    a cooling air nozzle configured to discharge cooling air onto the cooling fin and remove heat form the cooling fin,
    wherein the bearing is configured to support the compressor and/or the turbine, wherein the bearing system includes an electro-thermal cooling system configured for removing heat from the bearing, wherein the bearing is mounted on the shaft, and wherein the heat pipe is configured to remove heat from the bearing.

* * * * *